United States Patent [19]

Schulz et al.

[11] Patent Number: 4,966,050
[45] Date of Patent: Oct. 30, 1990

[54] CONTROL VALVE FOR REDUCING HARSHNESS OF ENGAGEMENT OF AN AUTOMATIC TRANSMISSION CLUTCH

[75] Inventors: Winfried Schulz, Pulheim; Johann Kirchhoffer, Cologne; Kurt Graef, Pulheim, all of Fed. Rep. of Germany

[73] Assignee: Ford Motor Company, Dearborn, Mich.

[21] Appl. No.: 345,913

[22] Filed: May 1, 1989

[30] Foreign Application Priority Data

Apr. 29, 1988 [DE] Fed. Rep. of Germany ....... 3814547

[51] Int. Cl.$^5$ .............................................. B60K 41/16
[52] U.S. Cl. ...................................... 74/867; 192/48.7
[58] Field of Search ................. 192/48.7, 87.11, 70.21; 74/867, 868

[56] References Cited

U.S. PATENT DOCUMENTS

| | | | |
|---|---|---|---|
| 3,679,033 | 7/1972 | Wagner | 192/48.7 |
| 4,225,029 | 9/1980 | Ushijima | 192/12 C |
| 4,265,346 | 5/1981 | Emmadi | 192/0.034 |
| 4,665,774 | 5/1987 | Oguri | 192/48.7 |
| 4,709,597 | 12/1987 | Yasue et al. | 74/868 |
| 4,727,774 | 3/1988 | Sumiya et al. | 74/867 |
| 4,744,269 | 5/1988 | Greene et al. | 74/868 |
| 4,765,202 | 8/1988 | Hayasaki | 74/868 |

FOREIGN PATENT DOCUMENTS 0860688  8/1981  U.S.S.R. ............................ 192/48.7

Primary Examiner—Dirk Wright
Attorney, Agent, or Firm—Donald J. Harrington; Frank G. McKenzie; Keith L. Zerschling

[57] ABSTRACT

A control valve for controlling the engagement of a friction drive clutch for an automatic transmission having multiple clutches and brakes for establishing a drive mode following a neutral mode wherein the valve regulates pressure distributed to the drive clutch and wherein the valve is in fluid communication with a second clutch whereby the latter acts as an accumulator for altering the rate of pressure buildup in the drive clutch thus eliminating harshness in the clutch engagement.

8 Claims, 3 Drawing Sheets

CONTROL VALVE FOR REDUCING HARSHNESS OF ENGAGEMENT OF AN AUTOMATIC TRANSMISSION CLUTCH

BACKGROUND OF THE INVENTION

Our invention comprises a control valve means for an hydraulicallY actuated clutch of an automatic motor vehicle transmission for reducing engagement force of a fluid pressure operated torque transmitting clutch when the transmission is conditioned for operation. It is particularly suited to be used in the automatic motor vehicle transmission disclosed in U.S. Pat. No. 4,744,269. Reference may be made to that patent to supplement this disclosure.

A pressure reducing control valve for an hydraulically actuated clutch of an automatic motor vehicle transmission is described in U.S. Pat. No. 4,265,346. That control valve is disposed in a control pressure line extending from a manual shift valve to the clutch. It comprises a valve member with two valve lands that register with internal valve lands in a valve chamber. Control pressure acts between the control lands. One end of the valve member is acted upon by a spring. The other end of the valve member is acted upon by pressure on the downstream side of a control orifice in a control pressure passage. A pressure buildup on the downstream side of the orifice during the initiation of the engagement of the clutch is delayed by means of a pressure accumulator. The accumulator pressure acts in the spring chamber to cushion the engagement of the clutch.

The control valve of the '346 patent requires for its operation an accumulator valve which normally occupies a relatively large space because of the volume of fluid involved. Available space, however, is extremely limited in control valve arrangements for automatic motor vehicle transmissions. In addition, the known control valve requires a regulating time for the clutch application pressure that is the same regardless of the degree of opening of the throttle valve for the engine. Even at the beginning of the pressure regulating period, the initial clutch application pressure is quite high. Following initial clutch engagement during the pressure regulating period a steep increase in pressure occurs.

BRIEF DESCRIPTION OF THE INVENTION

It is an object of the present invention to provide a control valve for an hydraulically actuated clutch for an automatic motor vehicle transmission that is effective to cushion the engagement of the reverse drive mode. It is able, without an accumulator valve, to provide a different regulating time for clutch application pressure buildup for a slight opening of the throttle-valve than the corresponding buildup time for a partial opening of the throttle valve with a low initial clutch pressure level.

The accumulator space in my improved design is formed by the pressure chamber of a pressure operated servo of a second hydraulic clutch. That clutch is a coast clutch which establishes a torque bypass flow path across an overrunning clutch that locks the elements of an overdrive gear unit together for operation with a ratio of unity. The servo for the second clutch is actuated at the same time as the principal clutch. A servo release spring on the release side of the servo of the second clutch exerts a smaller force than the force of the spring on the release side of the principal hydraulically actuated clutch. The regulating time following the opening of the throttle valve thus can be made variable during the clutch pressure buildup without the need for an accumulator valve.

The appropriate calibration of the valves for the two clutches is determined by an additional control orifice in the pressure line leading to the principal clutch. In this way, engagement of the reverse gear is cushioned. In particular when the engine throttle valve is opened only partially, there is no undesired harshness during clutch application.

BRIEF DESCRIPTION OF THE FIGURES OF THE DRAWINGS

The invention is explained in greater detail with reference to the embodiment illustrated in the accompanying drawings, in which.

PARTICULAR DESCRIPTION OF THE INVENTION

Figure 1:
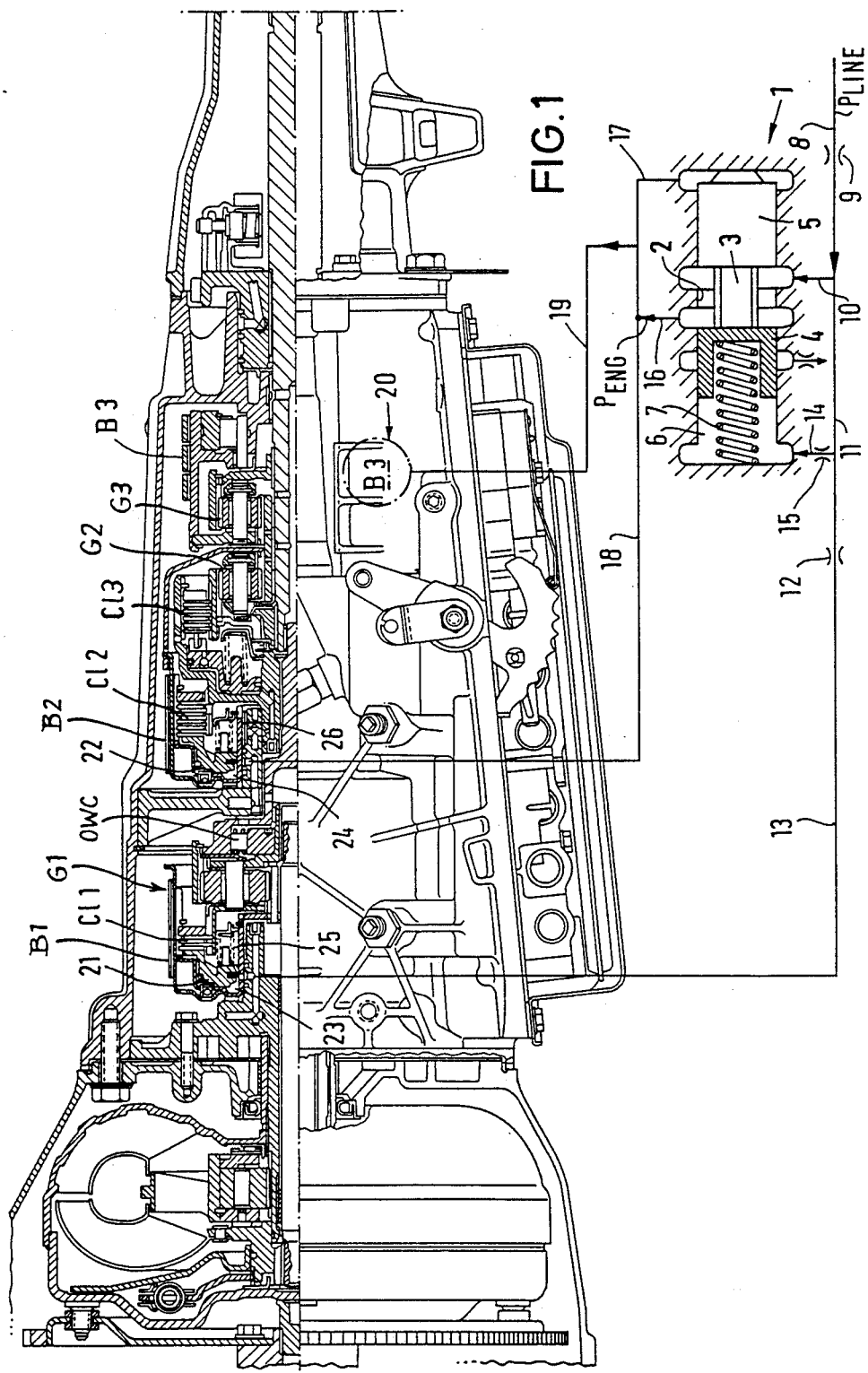
FIG. 1 is a partial sectional view of an automatic motor vehicle transmission with the fluid circuit for the control valve of the invention.
Figure 2:
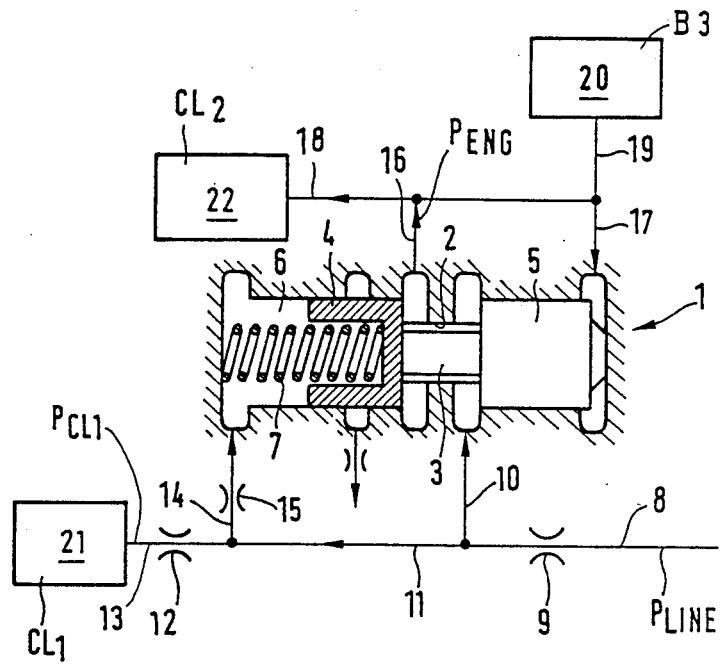
FIG. 2 is a diagrammatic illustration of the control valve of the invention.

The automatic motor vehicle transmission illustrated in FIG. 1 corresponds to the transmission described in detail in German application DE-PS 34 17 785. The control valve of the invention is included in that transmission.

In the transmission of FIG. 1 a coast clutch CL1 is applied during coast braking. During normal forward drive, the clutch CL1 is released. With the clutch CL1 released, the overrunning clutch OWC locks the carrier of gear unit G1 to the ring gear. During overdrive operation a brake band B1 anchors the sun gear of gear unit G1.

Control valve 1 comprises a displaceable valve member 3 arranged in a valve chamber 2. It has two control lands 4 and 5. A spring chamber 6 is formed at one end of valve chamber 2. A spring 7 in chamber 6 presses the valve member 3 to a right-hand position as 1 and 4 restricts exhaust flow through an exhaust path shown by the directional arrow.

The system pressure $P_{Line}$ in line 8 acts upon the valve member 3 between the two control lands 4 and 5 by way of a first control orifice 9 and a line 10. The system pressure reaches the first clutch CL1 by way of a line 11, a second control orifice 12 and a line 13. The line 13 communicates with the spring chamber 6 of the control valve 1 by way of a line 14 and a third control orifice 15.

The adjusted application pressure $P_{ENG}$ is distributed to line 16 and acts uPon the right-hand end of the valve member 3 by way of a feedback line 17. It is distributed by way of a line 18 to the principal hydraulic clutch CL2 and by a line 19 to the pressure operated servo 20 for the brake band B3.

A pressure operated servo 21 is provided for hydraulically actuating the clutch CL1 and a pressure operated servo 22 is provided for actuating the hydraulic clutch CL2. Forward clutch CL3 is applied during forward drive in each ratio. Clutch CL2 is applied for third, direct drive operation and during reverse drive. Brake B2 is applied during second ratio operation to anchor the sun gear of gear unit G2 and G3. The clutches CL2 and CL3 and the brakes B2 and B3 control the relative motion of the elements of gear units G2 and G3 to establish three forward drive ratios and a single reverse ratio. Gear units G2 and G3 are part of a well-known Simpson gear arrangement.

The pressure operated servos 21 and 22 comprise in each case a pressure apply chamber as shown at 23 and 24, respectively. Restoring spring arrangements 25 and 36 are disposed opposite the apply chambers.

According to the invention the restoring spring arrangements of the pressure operated servos 21 and 22 are such that the restoring spring arrangement 25 for the coast clutch CL1 develops a lower force than the restoring spring arrangement 26 of the clutch CL2.

Figure 4:
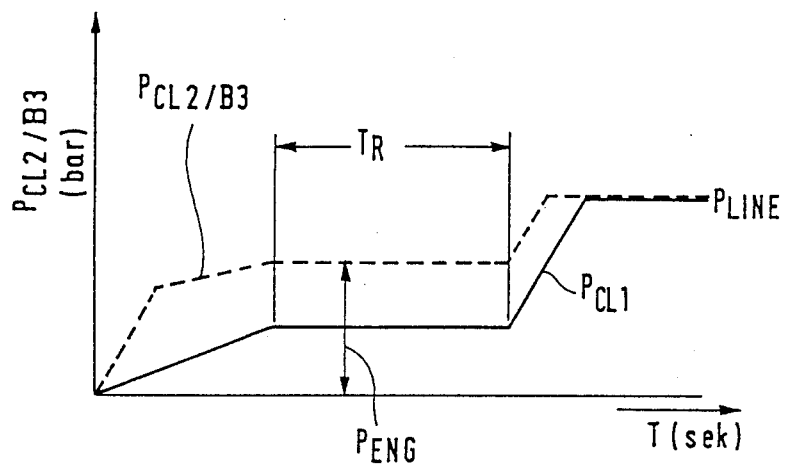
FIG. 4 a clutch pressure build-up diagram.

On account of the disposition of the first control orifice 9 and the second and third control orifices 12 and 15 in conjunction with the force of the spring 7 and the action of the feedback line 17, a delayed increase in the clutch application pressure $P_{ENG}$ over time, as indicated in the diagram of FIG. 4, can be obtained: e.g., $$P_{ENG} \frac{F_{spring\ 7}}{AO_{land\ 5}} + P_{CL1}$$

in which $F_{spring 7}$ is the force of the spring 7 acting upon the valve member 3, $AO_{land 5}$ is the area of the land 5 on the valve member 3, and $P_{CL1}$ is the control pressure which is produced from the charging of the servo 21 of the coast clutch CL1 with line pressure reduced by the control orifice 12 and by the force of the spring arrangement 25 for the coast clutch CL1.

The diagram in FIG. 3, which shows the application or actuation pressure $P_{ENG}$ or $P_{CL2/B3}$ over time T, is explained in greater detail below.

Figure 3:
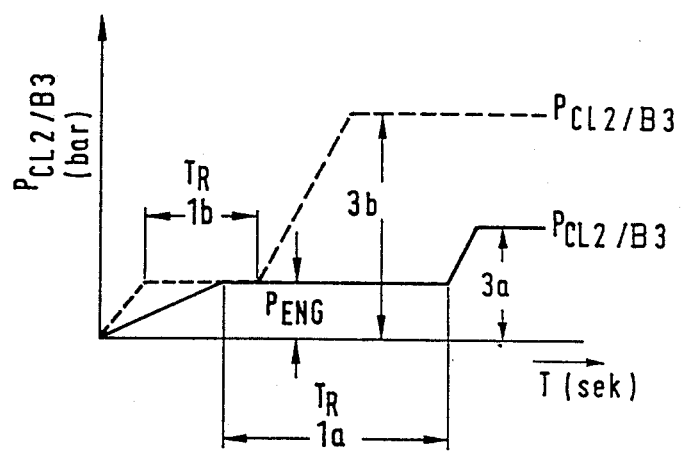
FIG. 3 is a diagram of the clutch application pressure over time for both port throttle operation and intermediate throttle operation.

As indicated by the characteristic increase in the clutch actuation pressure shown in continuous lines in FIG. 3, the control valve has a relatively long regulating time as shown at 1a, with a slight opening of the throttle valve and consequently a low capacity of the fluid pressure supply pump until the final actuation pressure is attained after a subsequent increase.

As indicated by the characteristic increase in the clutch actuation pressure shown in broken lines in FIG. 3, with the throttle valve partly opened the pressure initially increases more rapidly and is then kept constant over a shorter regulating time as shown at 1b. Since the pressure supplied by the fluid pressure pump is greater in this throttle valve position, the curve rises more rapidly to the final actuation pressure $P_{CL2/B3}$.

The application pressure during the different regulating times 1a and 1b remains constant, as indicated by $P_{ENG}$, since it is not dependent upon the throttle pressure and since the control valve has no differential surface areas.

As indicated in FIG. 3 by labels 3a and 3b, the final actuation pressure $P_{CL2/B3}$ is considerably higher with the throttle valve partly opened than with throttle valve opened to a minimum setting. Consequently, it is important that the clutch application Pressure $P_{ENG}$ be kept at a low level during the regulating time $T_R$. In this way a disturbing harshness in the engagement of forward clutch CL2 during the movement of the manual shift valve from the neutral position to the position for the reverse drive during engine idle is avoided.

As indicated by FIG. 4, the characteristic of the increase in the clutch application pressure $P_{ENG}$ for the second clutch CL2 and the brake band B3 is dependent upon the characteristic of the increase in the actuation pressure $P_{CL1}$ for the first clutch CL1.

Having described a preferred embodiment of the invention, what we claim is:

1. In an automatic transmission mechanism having torque transmitting gear elements and clutch and brake means for controlling the relative motion of the gear elements to effect plural torque delivery paths from a driving member to a driven member;

said clutch and brake means including multiple fluid pressure operated servos with a servo apply pressure chamber and a spring release means for opposing the fluid pressure servo apply force for each servo, a pressure source and a fluid circuit connecting said pressure source with said servos;

the improvement comprising:

a control valve in said circuit having a valve chamber between said pressure source and at least one of said servos, said control valve having a pressure inlet port, an exhaust flow path and a pressure outlet port in said valve chamber, a movable valve element in said valve chamber, said valve element comprising fluid pressure regulating lands registering with said valve ports whereby one of said lands progressively restricts communication between said ports when said valve element moves in one direction, and another of said lands progressively restricting said exhaust flow path when said valve element moves in the opposite direction, a regulated pressure feedback passage between said outlet port and one end of said valve element creating a pressure force urging said valve element in said one direction, said pressure inlet port being connected to said pressure source;

a fluid connection between an additional one of said servos and said pressure inlet port, said additional servo communicating with the other end of said valve element whereby the pressure developed in said additional servo communicates with said control valve to establish a pressure force on said valve element urging it in the opposite direction thereby modifying the pressure regulating characteristic of said valve.

2. The combination as set forth in claim 1 wherein said control valve comprises spring means acting on said valve element in said opposite direction for opposing regulated pressure forces acting on said valve element in said one direction, whereby said additional servo acts as a pressure accumulator for said one servo.

3. The combination as set forth in claim 1 wherein the communication between said additional servo and said one end of said valve element includes a first control orifice means for effecting a controlled rate of pressure buildup on said one valve element end.

4. The combination as set forth in claim 2 wherein the communication between said additional servo and said one end of said valve element includes a first control orifice means for effecting a controlled rate of pressure buildup on said one valve element end.

5. The combination as set forth in claim 4 wherein said connection between said valve inlet port and said pressure source comprises a second control orifice means for controlling the rate of pressure buildup in said one servo.

6. An automatic transmission comprising multiple ratio planetary gearing elements and a simple planetary gear unit on the torque input side of said multiple ratio gearing, a torque input shaft connected to one element of said simple planetary gear unit, a second element of said simple planetary gear unit being connected to a torque input element of said multiple ratio gearing, an overrunning brake means for anchoring a reaction element of said simple planetary gear unit, a fluid pressure operated clutch means for locking together two elements of said simple planetary gear unit including a fluid pressure operated clutch servo having a movable piston that defines in part a variable volume clutch pressure chamber;

a pressure source and a fluid circuit connecting said pressure source with said servos;
  clutch and brake means including multiple fluid pressure operated servos for controlling the relative motion of the elements of said multiple ratio gearing;
  a control valve in said circuit between said pressure source and said multiple servos, said control valve having a pressure inlet port and a pressure outlet port in said valve chamber, said outlet port being connected to said servos, said valve element comprising fluid pressure regulating lands registering with said valve ports whereby one of said lands progressively restricts communication between said ports when said valve element moves in one direction, said pressure inlet port being connected to said pressure source;
  a fluid connection between said clutch chamber and said pressure inlet port, said clutch chamber communicating with one end of said valve element whereby the pressure developed in said clutch chamber modifies the pressure regulating characteristics of said valve as said clutch means acts as a pressure accumulator.

7. The combination as set forth in claim 6 wherein the communication between said chamber and said valve includes a first control orifice means for effecting a controlled rate of pressure buildup on said valve.

8. The combination as set forth in claim 7 wherein said connection between said valve and said pressure source comprises a second control orifice means for controlling the rate of pressure buildup in said servos for said multiple ratio gearing.

* * * * *